(12) United States Patent
Sole Lopez et al.

(10) Patent No.: US 8,786,119 B2
(45) Date of Patent: Jul. 22, 2014

(54) ELECTRIC GENERATOR CONTROL SYSTEM AND METHOD

(75) Inventors: David Sole Lopez, Sarriguren (ES); Iker Garmendia Olarreaga, Zamudio (ES); Javier Coloma Calahorra, Sarriguren (ES); Jesús Mayor Lusarreta, Sarriguren (ES); Josu Elorriaga Llanos, Zamudio (ES); Ainhoa Carcar Mayor, Sarriguren (ES)

(73) Assignee: Ingeteam Power Technology, S.A., Bizkaia (ES)

( * ) Notice: Subject to any disclaimer, the term of this patent is extended or adjusted under 35 U.S.C. 154(b) by 81 days.

(21) Appl. No.: 13/643,904

(22) PCT Filed: Apr. 29, 2010

(86) PCT No.: PCT/ES2010/070276
§ 371 (c)(1),
(2), (4) Date: Feb. 1, 2013

(87) PCT Pub. No.: WO2011/135112
PCT Pub. Date: Nov. 3, 2011

(65) Prior Publication Data
US 2013/0200619 A1 Aug. 8, 2013

(51) Int. Cl.
*F03D 9/00* (2006.01)
*H02P 9/04* (2006.01)
*F03B 13/00* (2006.01)
*F03B 13/10* (2006.01)
*H02M 5/45* (2006.01)

(52) U.S. Cl.
USPC .................. 290/44; 290/43; 290/55; 363/37

(58) Field of Classification Search
USPC .................................. 290/43, 44, 55; 363/37
See application file for complete search history.

(56) References Cited

U.S. PATENT DOCUMENTS

| 3,887,862 | A | * | 6/1975 | Hubner .......................... 348/125 |
| 3,949,283 | A | * | 4/1976 | Okuyama et al. ......... 318/400.14 |
| 5,644,483 | A | * | 7/1997 | Peng et al. ....................... 363/37 |
| 5,949,664 | A | * | 9/1999 | Bernet et al. ..................... 363/37 |
| 6,856,040 | B2 | * | 2/2005 | Feddersen et al. .............. 290/44 |
| 7,368,890 | B2 | * | 5/2008 | Pande et al. ................... 318/812 |
| 7,372,174 | B2 | * | 5/2008 | Jones et al. ..................... 290/44 |

(Continued)

FOREIGN PATENT DOCUMENTS

| JP | 6-9164 A | 1/1994 |
| JP | 2003-111492 A | 4/2003 |
| JP | 2007-135254 A | 5/2007 |
| JP | 2008-301584 A | 12/2008 |

OTHER PUBLICATIONS

Japanese Office Action, dated Jan. 7, 2014, issued in corresponding Japanese Patent Application No. 2013-506688.

*Primary Examiner* — Pedro J Cuevas
(74) *Attorney, Agent, or Firm* — Sughrue Mion, PLLC

(57) ABSTRACT

The invention describes a system and a method for controlling an electric generator connected to the power grid during a voltage drop in the power grid, the system comprising a back-to-back converter (2) connected between the generator (3) and the power grid (4) and also, in parallel to the generator side converter (2a), rectifying means (5) connected in series between the generator (3) and the DC-link (2b) of the back-to-back converter (2), thus providing an alternative way for the energy excess at the generator side to enter the DC-link (2b).

18 Claims, 3 Drawing Sheets

(56) References Cited

U.S. PATENT DOCUMENTS

| | | |
|---|---|---|
| 7,425,771 B2 * | 9/2008 | Rivas et al. ............... 290/44 |
| 7,511,385 B2 * | 3/2009 | Jones et al. ............... 290/43 |
| 7,579,702 B2 * | 8/2009 | Park et al. ................ 290/44 |
| 7,656,052 B2 * | 2/2010 | Jones et al. ............... 290/43 |
| 7,692,321 B2 * | 4/2010 | Jones et al. ............... 290/43 |
| 7,939,954 B2 * | 5/2011 | Ruiz Flores et al. ........ 290/44 |
| 8,183,704 B2 * | 5/2012 | Rivas et al. .............. 290/44 |
| 8,207,623 B2 * | 6/2012 | Rivas et al. .............. 290/44 |
| 8,264,094 B2 * | 9/2012 | Rivas et al. .............. 290/44 |
| 8,294,288 B2 * | 10/2012 | Rivas et al. .............. 290/44 |
| 8,541,898 B2 * | 9/2013 | Acedo Sanchez et al. ..... 290/44 |
| 2004/0195994 A1 | 10/2004 | Kume et al. ............... 318/807 |
| 2007/0182361 A1 * | 8/2007 | Pande et al. .............. 318/812 |
| 2008/0150285 A1 * | 6/2008 | Corcelles Pereira et al. ... 290/44 |
| 2008/0296898 A1 | 12/2008 | Ichinose et al. ............ 290/44 |
| 2009/0167095 A1 * | 7/2009 | Rivas et al. .............. 307/87 |
| 2009/0200803 A1 | 8/2009 | Ichinose et al. ............ 290/44 |
| 2009/0273185 A1 | 11/2009 | Ruiz Flores et al. ........ 290/44 |
| 2009/0278351 A1 * | 11/2009 | Rivas et al. .............. 290/44 |
| 2009/0278352 A1 * | 11/2009 | Rivas et al. .............. 290/44 |
| 2009/0278354 A1 | 11/2009 | Ichinose et al. ............ 290/44 |
| 2011/0018270 A1 * | 1/2011 | Corcelles Pereira et al. ... 290/44 |
| 2011/0057443 A1 * | 3/2011 | Rivas et al. .............. 290/44 |
| 2011/0140432 A1 * | 6/2011 | Acedo Sanchez et al. ..... 290/44 |
| 2011/0156390 A1 * | 6/2011 | Mayor Lusarreta et al. ... 290/44 |
| 2011/0310642 A1 * | 12/2011 | Dai et al. ................. 363/37 |
| 2012/0119722 A1 * | 5/2012 | Sole Lopez et al. ......... 323/299 |
| 2012/0139353 A1 * | 6/2012 | Olea Oregi et al. ......... 307/82 |
| 2013/0027003 A1 * | 1/2013 | Zheng et al. .............. 322/99 |
| 2013/0038061 A1 * | 2/2013 | Rivas et al. .............. 290/44 |
| 2013/0147194 A1 * | 6/2013 | Mayor Lusarreta et al. ... 290/44 |
| 2013/0223110 A1 * | 8/2013 | Zabaleta Maeztu et al. ... 363/34 |
| 2013/0234434 A1 * | 9/2013 | Langel .................... 290/44 |
| 2013/0313826 A1 * | 11/2013 | Gupta et al. .............. 290/44 |

* cited by examiner

ELECTRIC GENERATOR CONTROL SYSTEM AND METHOD

RELATED APPLICATIONS

This application is a §371 national stage of PCT International Application No. PCT/ES2010/070276, filed Apr. 29, 2010, the contents of each of which are hereby incorporated by reference into this application.

OBJECT OF THE INVENTION

The object of the invention is a system and a method for controlling an electric generator connected to the power grid during a voltage drop in the power grid.

BACKGROUND OF THE INVENTION

Lately, the number of wind generators and wind farms connected to the power grid is dramatically growing. For this reason, grid connection requirements are becoming increasingly demanding and, as a consequence, wind generator control systems become more complex each year. Specifically, grid connection requirements require the wind generator to perform well during short duration voltage drops in the power grid.

A back-to-back converter is a known device employed for connecting a generator to the power grid. A back-to-back converter comprises a generator side converter and a power grid side converter connected by means of a DC-link. Back-to-back converters are employed in DFIG (doubly fed induction generator) systems, in which case they connect the rotor of the generator to the power grid, and also in full converter systems, in which case they connect the stator or the generator to the power grid. Both DFIG and full converter systems are part of the prior art.

More specifically, DFIG is nowadays widely employed due to the fact that it provides a number of economic and technical advantages over most other systems. In a DFIG, if no action is taken, a voltage drop in the power grid produces a transient phase causing an overvoltage in the rotor windings which may be destructive for the generator side converter.

Therefore, in order to fulfil the grid connection requirements, DFIG systems include a device allowing, on one hand, to keep the generator connected to the grid during the transient phase, and, on the other hand, to maintain control of the wind turbine. This device is typically known as "crowbar" or "crowbar unit". International patent application PCT/ES2006/000264 discloses a crowbar unit which is activated when a voltage drop in the power grid is detected. The crowbar unit lowers the voltage at the rotor windings basically by means of a short-circuit, therefore protecting the generator side converter of the back-to-back converter.

Recently, increasingly demanding grid connection requirements require a shorter transient phase. However, if current crowbar units are prematurely deactivated, destructive voltages may still be present in the rotor windings. Therefore, a need still exists of control systems for electric generators connected to the power grid.

DESCRIPTION

Usually the back-to-back converter is designed to manage the rated capacity requested for the power conversion system (100% of wind turbine power in full converter and 30% of wind turbine power in DFIG). Therefore, the antiparallel diodes of the back-to-back converters (e.g. IGBTs) are not rated to stand the overcurrent that might arise in case of a voltage drop and, hence, a failure could appear in case the generator side converter is not disconnected from the generator.

In order to solve this problem, a first aspect of the invention describes an electric generator control system comprising a back-to-back converter connected between the generator and the power grid, and further comprising, in parallel to the generator side converter, rectifying means connected in series between the generator and the DC-link of the back-to-back converter.

This new topology allows the back-to-back converter to remain under control during the whole voltage drop, thus permitting an earlier injection of reactive power to the grid in comparison with existing crowbar systems. Additionally, the back-to-back converter does not need to be designed and manufactured with the capability of withstanding very high currents, therefore being more economic and easy to manufacture.

The rectifying means converts the tree-phase voltages and currents at the generator side to DC voltages and currents. Preferably, the rectifying means comprises a bridge comprising diodes, a bridge comprising IGBT's or a bridge comprising thyristors. In cases where the rectifying means comprises active elements (IGBT's, thyristors or others), it can be operated for activation of the control system of the invention at a selected instant after a voltage drop in the power grid is detected.

Therefore, the control system of the invention provides an alternative connection between the generator and the DC-link in parallel to the generator side converter, allowing the energy excess at the generator side to enter the DC-link and at the same time keeping the voltages at the generator side converter low enough to prevent its failure.

According to a preferred embodiment, the invention further comprises semiconductor means connected in series with the rectifying means. The semiconductor means serves mainly to avoid currents from going back from the DC-link towards the generator side when there is no voltage drop, a problem which may arise with certain types of rectifying means Preferably, the semiconductor means comprises two thyristors or diodes, each connecting respectively the positive and negative poles of the DC-link and the rectifying means. When formed by active elements, the semiconductor means may further be employed for operating the control system of the invention at a selected instant after a voltage drop in the power grid is detected.

The energy excess conveyed to the DC-link may be treated in a number of ways. For example, it may pass through the power grid side converter towards the power grid. According to another preferred embodiment, the invention further comprises energy dissipation means connected to the DC-link. The energy dissipation means may be of any type (capacitive, inductive or resistive), but in a preferred embodiment they are resistive, for example a chopper circuit, in which case the energy excess is dissipated. Alternatively, the energy dissipation means may be capacitive, in which case the excess energy is absorbed and subsequently released after the voltage drop in the power grid. As an additional advantage, since the DC-link of a conventional back-to-back converter usually comprises a capacitor bank, the capacitive energy dissipation means could be incorporated in the capacitor bank.

Preferably, the electric generator controlled by the system of the present invention is connected to a wind turbine.

In another preferred embodiment of the invention, the electric generator is a doubly-fed induction generator (DFIG), the rectifying means then being connected to the rotor of the generator.

In prior art systems, as the stator of the generator is connected to the grid, the overvoltage and, thus, the overcurrent caused in the rotor of the generator, might be too high for a conventional back-to-back converter to stand it. Therefore, the generator side converter is disconnected unless it has the capacity of managing such conditions. In case a crowbar is placed in between the rotor and the generator side converter, said excess current could be dissipated preventing it to flow through the converter. The present invention allows this current to flow into the DC-link without damaging the generator side converter, with the additional advantage of keeping the control of the back-to-back converter during the time of the voltage drop. This advantage allows the converter system to recover the generator control promptly and improve the wind turbine behavior for low voltage ride through. For instance, in a preferred but not-limiting embodiment, supplying reactive power to the grid in a short period of time after detection of grid drop.

In yet another preferred embodiment of the invention, the electric generator is controlled in full converter mode, the rectifying means then being connected to the stator of the generator. In full converter systems the electric generator is not directly connected to the grid so the behavior of the system is not as severe as in a DFIG system. However, the present invention provides further additional capacity of the diodes of the power converter as well. So in case an overspeed (and, hence, probably an overvoltage in a permanent magnet generator) or an overload occurs, the present invention may support the back-to-back converter to withstand such situations allowing a bigger amount of current to flow through the generator side converter to the DC-link.

A second aspect of the invention is directed to a method for controlling an electric generator connected to the power grid by means of a back-to-back converter where, in response to a voltage drop in the power grid, the generator is connected to the DC-link of the back-to-back converter through rectifying means provided in parallel to the generator side converter for conducting an energy excess in the generator towards the DC-link.

In a preferred embodiment, the energy excess is dissipated by resistive dissipation means connected to the DC-link.

In a further preferred embodiment, the energy excess is transmitted to the power grid through the grid side converter of the back-to-back converter.

In yet a further preferred embodiment, the energy excess in the generator is absorbed by capacitive dissipation means connected to the DC-link and subsequently released once the grid has recovered from the voltage drop.

DESCRIPTION OF A PREFERRED EMBODIMENT

A preferred embodiment of the invention is now described taking into account the aforementioned drawings.

Figure 1A:
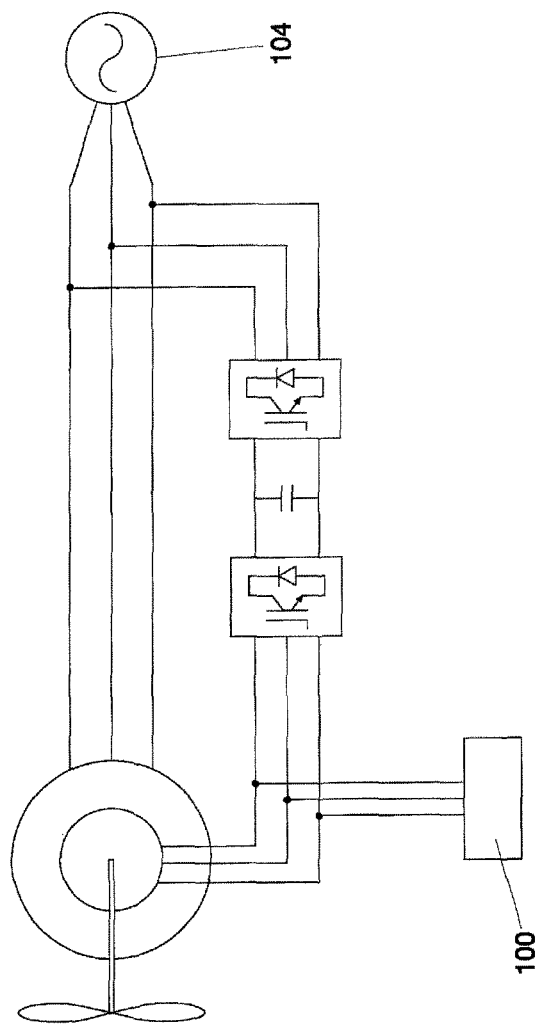
FIG. 1a shows a prior art DFIG control system for a wind generator connected to the power grid.
Figure 1B:
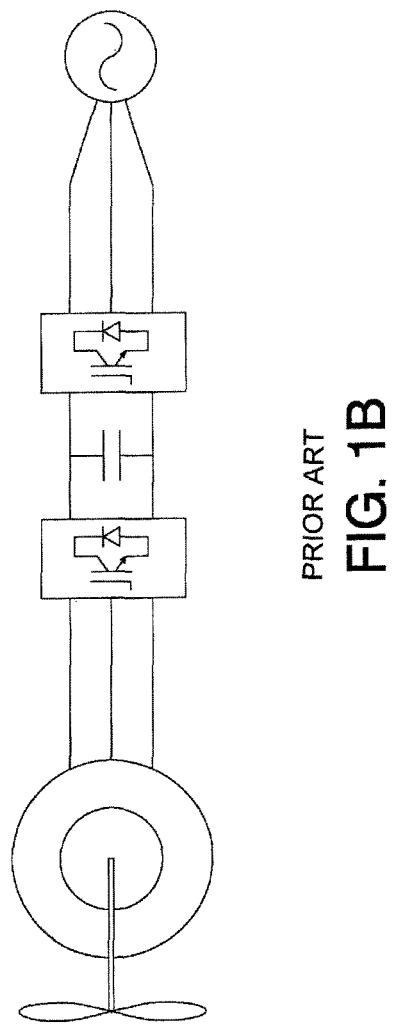
FIG. 1b shows a prior art full converter control system for a wind generator connected to the power grid.

FIG. 1a shows a DFIG connected to a wind turbine and comprising a crowbar unit (100) according to the prior art. When a voltage drop occurs in the power grid (104), the crowbar unit (100) is activated, thus dissipating the energy excess. On the other hand, FIG. 1b shows a generator connected to a wind turbine and controlled in full-converter mode.

Figure 2:
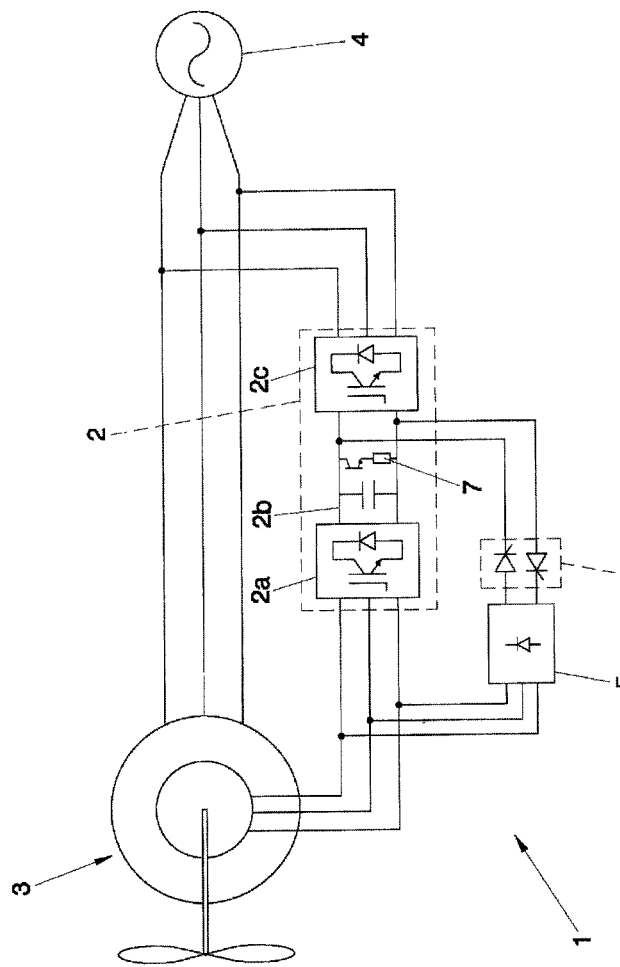
FIG. 2 shows the control system of a preferred embodiment of the invention connected to a doubly fed induction generator.

FIG. 2 shows a doubly fed induction generator (3) having the control system (1) of the invention. As in the prior art, the rotor of the generator (3) is connected to the power grid (4) by means of a back-to-back converter (2). The back-to-back converter (2) comprises a generator side converter (2a), a DC-link (2b) and a power grid side converter (2c). On the other hand, the stator of the generator (3) is directly connected to the power grid (4).

The system (1) of the invention in this example further comprises rectifying means (5) and semiconductor means (6) connected in series between the rotor of generator (3) and the DC-link (2b), in parallel to the rotor side converter (2a). The rectifying means (5) of this example comprises a diode bridge while the semiconductor means (6) comprises thyristors respectively connecting the positive and the negative poles of the DC-link (2b) and the rectifying means (5).

As explained previously in the present application, the energy excess conveyed to the DC-link (2) may be transmitted to the power grid (4) through the power grid side converter (2c). However, it is also possible to provide dissipation means (7) connected to the DC-link (2b). These dissipation means (7) may be resistive, in which case the energy excess is dissipated. For example, a chopper unit may be employed. The dissipation means (7) may also be capacitive, in which case the energy excess is absorbed and subsequently released once the power grid (4) has recovered from the voltage drop. Note that, in this case, the capacitive dissipation means (7) may also be integrated in the conventional capacitor bank usually connected to prior art DC-links.

The invention claimed is:

1. An electric generator control system comprising:
    a back-to-back converter adapted to be connected between a generator and a power grid, the back-to-back converter comprising a generator side converter, and a DC-link connected in series,
    a rectifying unit connected in parallel to the generator side converter and connected in series to the DC-link, and,
    a semiconductor unit comprising a first thyristor, connected in series between a positive pole of the DC-link and a DC output of the rectifying unit, and a second thyristor connected in series between a negative pole of the DC-link and a DC output of the rectifying unit.

2. The electric generator control system according to claim 1, wherein the rectifying unit comprises a bridge comprising one of a diode, an insulated-gate bipolar transistor, and a thyristor.

3. The electric generator control system according to claim 2, wherein the rectifying unit is connected to a rotor of the generator.

4. The electric generator control system according to claim 2, wherein the rectifying unit is connected to a stator of the generator.

5. The electric generator control system according to claim 2, further comprising a resistive dissipation unit connected to the DC-link.

6. The electric generator control system according to claim 1, wherein the rectifying unit is configured to be connected to a rotor of the generator.

7. The electric generator control system according to claim 6, wherein the rectifying unit is connected to a stator of the generator.

8. The electric generator control system according to claim 6, further comprising a resistive dissipation unit connected to the DC-link.

9. The electric generator control system according to claim 1, wherein the rectifying unit is configured to be connected to a stator of the generator.

10. The electric generator control system (1) according to claim 9, further comprising a resistive dissipation unit connected to the DC-link.

11. The electric generator control system according to claim 1 further comprising a resistive dissipation unit connected to the DC-link.

12. A wind power generator comprising:
a generator; and
the generator control system according to claim 1.

13. A method for controlling an electric generator connected to a power grid by a back-to-back converter comprising a generator side converter and a DC-link connected in series, the method comprising:
connecting a rectifying unit in parallel to the generator side converter and in series to the DC-link,
connecting a semiconductor unit comprising a first thyristor, connected in series between a positive pole of the DC-link and a DC output of the rectifying unit, and a second thyristor, connected in series between a negative pole of the DC-link and a DC output of the rectifying unit, and
in response to a voltage drop in the power grid, controlling the rectifying unit to conduct an energy excess in the generator towards the DC-link.

14. The method for controlling an electric generator according to claim 13 further comprising:
driving the semiconductor unit to enable the energy excess to flow through the rectifying unit towards the DC-link.

15. The method of claim 13, wherein the semiconductor unit comprises a plurality of thyristors, and wherein the driving the semiconductor unit comprises a control system driving the semiconductor unit at a time selected by the control system.

16. The method of claim 13, wherein the driving the semiconductor unit comprises enabling the excess energy to flow to the power grid through a grid-side converter of the back-to-back converter.

17. The method of claim 13, further comprising connecting a capacitive dissipation unit to the DC-link, and wherein the method further comprises the capacitive dissipation unit absorbing the excess energy and releasing the excess energy once the power grid has recovered from the voltage drop.

18. The method according to claim 13, further comprising:
providing the electrical generator and the back-to-back converter.

* * * * *